United States Patent [19]

Maxwell

[11] 3,760,523

[45] Sept. 25, 1973

[54] FISH NET

[76] Inventor: James D. Maxwell, P.O. Box 649, Vancouver, Wash. 98660

[22] Filed: July 13, 1971

[21] Appl. No.: 162,193

[52] U.S. Cl. ................................................. 43/11
[51] Int. Cl. .......................................... A01k 77/00
[58] Field of Search .................................. 43/11, 12

[56] References Cited
UNITED STATES PATENTS

| | | | |
|---|---|---|---|
| 3,579,890 | 5/1971 | Maxwell | 43/12 |
| 803,160 | 10/1905 | Franklin | 43/11 |
| 2,633,351 | 3/1953 | Fowle | 43/11 |
| 2,463,621 | 3/1949 | Herzog | 43/11 |
| 2,874,506 | 2/1959 | Cliff | 43/11 |

*Primary Examiner*—Warner H. Camp
*Attorney*—Eugene M. Eckelman

[57] ABSTRACT

A fish net having a yoke with a rearwardly opening socket for interconnection with a handle and a pair of forwardly opening sockets for interconnection with end portions of a hoop. The two forwardly opening sockets extend at about 90° relative to each other and have a non-rotatable connection with respective end portions of the hoop. The rearwardly opening socket of the yoke includes an inner sleeve portion securely receiving an elongated tubular handle part and also includes an outer sleeve portion for receiving another handle part such as a cork covering. The handle has an end cap provided with an inner sleeve portion for securement to the tubular handle part and an outer sleeve portion for receiving the rearward end of the cork covering. A passageway extends through the handle, through the yoke, and through the hoop for receiving an elastic cord for attachment of the net to a fisherman's body.

3 Claims, 3 Drawing Figures

PATENTED SEP 25 1973 3,760,523

INVENTOR
JAMES D. MAXWELL
BY Eugene M. Eckelman
ATTORNEY

FISH NET

BACKGROUND OF THE INVENTION

This invention relates to new and useful improvements in fish nets.

Fish nets have heretofore been provided which include a hoop for supporting a net and a handle for grasping. The net parts must be of sturdy construction for supporting a fish in the net, and for this purpose such handles and means for attaching said handles to the hoop have been of heavy sturdy construction. Such makes the fish net expensive to manufacture and cumbersome to carry on the person.

SUMMARY OF THE INVENTION

According to the invention and forming a primary objective thereof, a fish net is provided which has a novel structure in that such structure has maximum strength while being of lightweight structure. More particularly, such structure includes a yoke portion with a pair of sockets which extend at right angles from each other and which receive end portions of a hoop in a non-rotatable connection, the right angle disposition of the two sockets and the non-rotatable connection of the hoop ends therein providing for maximum strength in that the downward forces acting on the hoop at the socket members is not only resisted by the bending strength of the hoop material but also by a torsional resistance of said material.

Another object is to provide a fish net yoke having means for novel connection to a handle comprising a first or inner sleeve portion for integral connection to a tubular core part of the handle and a second or outer sleeve part for receiving a tubular cork portion of the handle. Such structure provides an arrangement wherein the handle may comprise said core part engaged in said first sleeve portion and a cork covering engaged in said second sleeve portion or simply a single handle part engaged in said second sleeve.

Another object is to provide a fish net handle employing a yoke member, a handle, and a hoop member each with a passageway therethrough for receiving an elastic cord which extends through the handle as well as through the yoke and around the hoop to provide a connecting cord which has a long elastic reach.

The invention will be better understood and additional objects and advantages will become apparent from the following description which illustrates a preferred form of the device.

DETAILED DESCRIPTION OF THE PREFERRED EMBODIMENT

Figure 1:
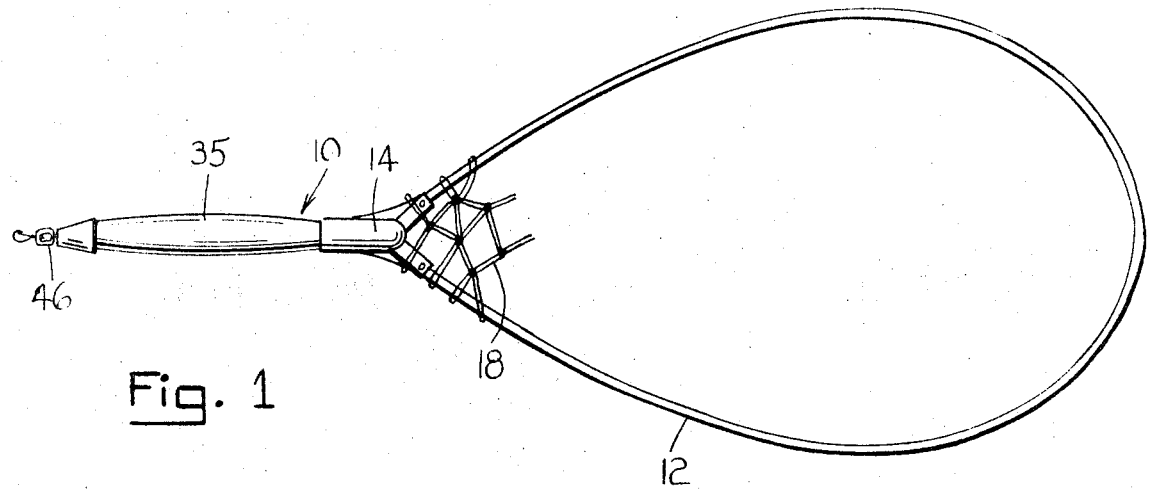
FIG. 1 is a plan view of a fish net embodying features of a first form of the instant invention.
Figure 2:
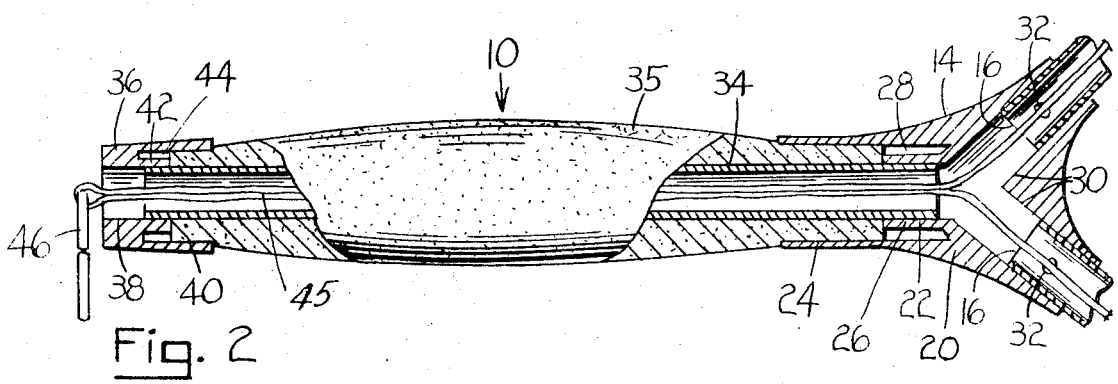
FIG. 2 is an enlarged fragmentary plan view of the embodiment of FIG. 1 with portions thereof broken away to show internal structure.

Referring now in particular to the drawings and first to FIGS. 1 and 2 which show one form of the invention, the numeral 10 designates generally the handle of a net, the numeral 12 designates a hoop, and the numeral 14 designates generally a yoke or neck member which connects the handle to the hoop. Hoop 12 has disconnected ends 16, FIG. 2, and has netting 18 of the usual construction attached thereto.

Yoke 14 has a body portion 20 with a bore 22 and a counterbore 24, the said counterbore opening through the rearward end of the body portion. Bore 22 is defined by a rearwardly extending sleeve portion 26 having a pocket 28 therearound formed by a forward extension of counterbore 24. Sleeve 26 projects only a part way back through the bore 22 and opens at its front end in communication with oppositely extending bore portions 30. The outer ends of bore portions 30 form sockets for receiving the disconnected ends 16 of the hoop. Such disconnected ends are tightly fitted in the sockets and in addition are secured non-rotatably therein by pins 32 extending through the body portion and through the disconnected ends. Bore portions 30 extend at approximately right angles to each other to provide for maximum strength connection between the yoke and the hoop. With the said bore portions being disposed at substantially right angles to each other, the portions of the hoop extending into the body portion and adjacent thereto not only support downward weight of a fish by structural bending strength of the metal in the tubular hoop but in addition provide a torsional resistance. That is, if the disconnected ends of the hoop were made to extend away from the body portion 20 at an angle less than 90° with relation to each other, a downward force in the net is supported principally by the bending strength of the metal and if the disconnected ends extend out from each other at an angle greater than 90°, the principal portion of weight in the net is supported by the torsional strength of the metal. It has been found that the disposition of the disconnected ends at approximately 90° from each other provides a strong support at the joint, evidently resulting from a combined resistance of the bending strength and torsional strength of the hoop material.

Handle 10 comprises an inner tubular core member 34 the forward end of which is secured in bore 22 such as by a press fit or by adhesive, or both. Core member 34 is of rigid material such as metal and supports thereon in integral relation a tubular cork portion 35 which forms the gripping area of the handle. The outer diameter of the cork portion 35 is of selected dimension whereby the forward end thereof fits in counterbore 24 and may be glued therein. The counter-bored portion 24 of the body 20 thus forms a sleeve for receiving a forward part of the cork portion 25.

The rearward end of the handle carries a cap 36. Such cap has a bore 38 therethrough and a counterbore 40 opening through the forward end of the cap. Bore 38 is defined partly by an integral forwardly extending internal sleeve 42 which projects into the counterbore 40 and, similar to the pocket 28 in the yoke 14, a pocket 44 is formed around the periphery of the sleeve 42. The cap 36 is mounted on the handle by providing a secured fit of an end portion of the tubular core 34 in the bore 38 and a secured fit of a rearward portion of the cork 35 within the counterbore 40.

As best seen in FIG. 2, a hollow passageway is provided completely through the handle, through the yoke, and through the hoop. Such is formed by the bore 38 in end cap 36, hollow handle core portion 34, bore 22 in yoke 14, flared bores 30 in the yoke, and the tubular construction hoop 12. Extending through the passageway is an elongated length of elastic cord 45 having its ends projecting rearwardly from the handle and attached to a fastener 46 of a suitable type capable of being removably attached to a fisherman's clothes or other fishing accessory. The elastic cord, being of extended length in its path through the handle and around the hoop, allows considerable stretch length so that while the elastic cord will normally maintain itself retracted within the net structure, it can be stretched a great distance. The fisherman thus can reach down to net a fish without disconnnecting the end of the elastic rope from his body.

Figure 3:
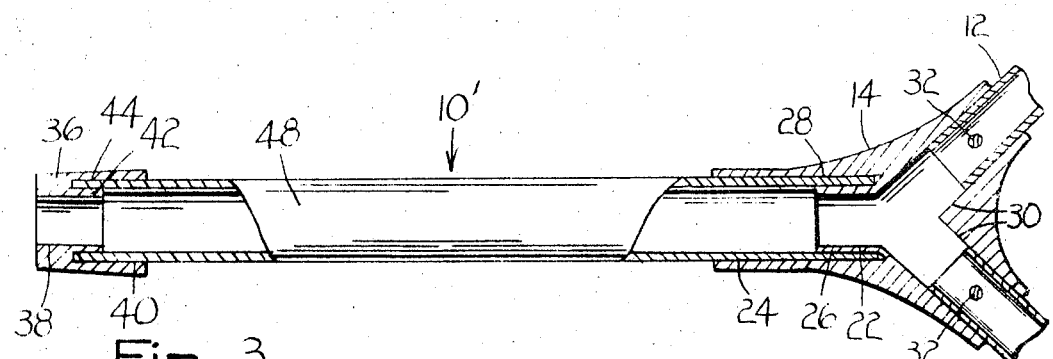
FIG. 3 is a view similar to FIG. 2 but showing a different embodiment.

FIG. 3 illustrates the versatility of the present handle construction and more particularly the versatility thereof resulting from the structure of the yoke 14 and end cap 36. That is, as viewed in FIG. 2, a cork covered handle may be used or as viewed in FIG. 3 a metal handle may be used. In the use of the cork covered handle as already described, the cork portion terminates at the sleeves 26 and 42, with the projecting ends of the tubular core portion 34 being secured within the said respective sleeves. In the use of a metal handle 10' of FIG. 3, however, a unitary rigid tubular handle member 48 is secured in the counterbores 24 and 40 with the ends thereof projecting into the pockets 28 and 44 to provide a positive connection of the handle to the yoke 14 and end cap 36. The handle member 48 may have a press fit within the cap 36 and yoke 14 or be adhesively secured therein.

According to the present invention, a yoke and handle structure is provided which although being light in weight provides a rugged structure. It is to be understood that the forms of my invention herein shown and described are to be taken as preferred examples of the same and that various changes in the shape, size and arrangement of parts may be resorted to without departing from the spirit of my invention or the scope of the subjoined claims.

Having thus described my invention, I claim:

1. A fish net comprising
   a. a tubular hoop supporting a net thereon,
   b. said hoop having disconnected ends,
   c. a yoke having forward and rearward ends,
   d. means at the forward end of said yoke defining a pair of sockets for receiving respective disconnected ends of said hoop in a secured, non-rotatable fit,
   e. said forward sockets in the yoke leading outwardly at approximately a right angle relative to each other,
   f. a rearwardly opening socket in said yoke defined by an inner sleeve portion,
   g. a handle engageable with said sleeve portion in a secured, non-rotatable fit,
   h. means defining a passageway extending through said handle and through said yoke to said forward sockets for communication with the interior of said hoop,
   i. and elastic cord means extending from the rearward end of said handle through said handle, through said yoke, and through said hoop.

2. A fish net comprising
   a. a tubular hoop supporting a net thereon,
   b. said hoop having disconnected ends,
   c. a yoke having forward and rearward ends,
   d. means at the forward end of said yoke defining a pair of sockets for receiving respective disconnected ends of said hoop in a secured non-rotatable fit,
   e. said forward sockets in the yoke leading outwardly at approximately a right angle relative to each other,
   f. a rearwardly opening socket in said yoke defined partly by an inner sleeve portion and partly by an outer sleeve portion,
   g. and a handle having two parts one of which is received in said inner sleeve portion and the other of which is received in said outer sleeve portion, the latter handle part being fitted around the other handle part and comprising a gripping area.

3. The fish net of claim 2 including an end cap at the rearward end of said handle, said cap having an inner sleeve portion for receiving said one handle part and having an outer sleeve portion for receiving said other handle part.

* * * * *